March 2, 1954
W. D. HOPE
2,671,127
COUPLING FOR COAXIAL CABLES
Filed Feb. 18, 1944
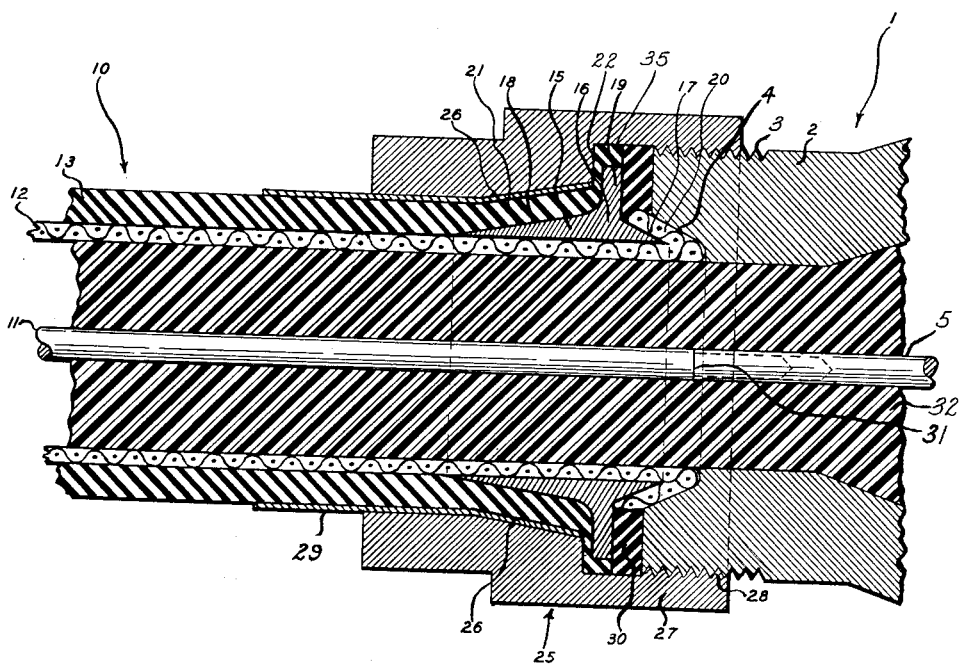
INVENTOR.
WILLIAM D HOPE
BY
William D. Hall.
Attorney Patented Mar. 2, 1954

2,671,127

UNITED STATES PATENT OFFICE 2,671,127

COUPLING FOR COAXIAL CABLES

William D. Hope, Cambridge, Mass., assignor, by mesne assignments, to the United States of America as represented by the Secretary of War Application February 18, 1944, Serial No. 522,947

11 Claims. (Cl. 174—88)

The present invention relates to a detachable coupling and is particularly directed toward a coupling for use with coaxial cables used in high frequency communication equipment.

The principal purpose of the present invention is to provide a readily detachable coupling which will at the same time be effective to seal the interiors of the cables at the joint. This feature is important where equipment may be subjected to external pressure variations ranging down to subatmospheric pressures. It is desirable that air pressure within the equipment, including cables, be maintained at or above atmospheric. This provision is necessary to maintain the insulating and dielectric qualities of air as well as to prevent moisture condensation from repeated pressure changes.

The coupling also maintains the cables against deformations tending to vary the transmission characteristics, as well as by variation of the dielectric constant of air between the axial and coaxial conductors which would follow variation of pressure within the cable, with accompanying ineffectiveness and distortion, if not inoperativeness of a receiver unit.

Another object is to provide a coupling which is readily attachable and detachable, thus avoiding difficulties attending use of the usual sealed joints.

Other features and advantages of the invention will become readily apparent as the description proceeds, reference being had to the accompanying drawing wherein a preferred form of the invention is shown. It is to be understood, however, that the drawing and description are illustrative only, and are not to be taken as limiting the invention except insofar as it is limited by the claims.

The accompanying drawing is a longitudinal section of the coupling.

Referring now to the drawing, a fixed cable or other device is indicated at 1. The device 1 terminates in a sleeve 2 of brass or other suitable metal, which is sealed to or integral with the device and is provided at its outer end with external threads 3. The inside of sleeve 2 has a flared tapered surface or contact seat 4 within its outer end and a planiform end seal face outwardly of the seat 4. A conductor 5 is disposed centrally within the sleeve 2 and is spaced and supported therefrom in any suitable manner.

A flexible coaxial cable which is to be coupled to the device 1 is indicated at 10. The cable 10 includes a central (axial) conductor 11, a spaced outer (coaxial) conductor and electrical sheath 12 and an external layer of insulation 13 as a dielectric hermetic sheath. The outer conductor 12 may be of woven or braided copper wire construction. The insulation sheath 13, which overlies the outer conductor, may be rubber or other plastic material.

An annular metallic draw-sleeve 15 is disposed about the braided part of the cable 10 near its end, and a wedge portion 18 thereof lies between conductor 12 and insulation 13 to enlarge the latter. The sleeve 15 is thick at its intermediate region 16 and tapers down therefrom toward either end as shown at 17 and 18 forming sharp annular edges at the extremities. An annular flange 19 projects from the thick intermediate region 16. Sleeve 15 may be secured to the conductor 12 in any suitable fashion, as for example with solder. The sleeve 15 may be termed a floating sleeve, to indicate its relation to the two pieces 2 and 25. Free end 20 of the conductor 12 is turned back so as to overlie the tapered surface 17 of sleeve 15. A part 21 of the insulation 13, which is separated from the conductor 12 by the sleeve 15, overlies the tapered surface 18 and abuts and covers one side and the periphery of the flange 19 of the sleeve.

Another metallic sleeve member or coupling 25 is disposed revolvably about the cable 10 inwardly of its end. This sleeve has a smooth cylindrical bore at its outer end and a portion 26 of its interior surface flared toward the joint to cooperate with the tapered surface 18 of the sleeve 15. Its larger part is of substantially less radius than the flange. The sleeve 25 also has an enlarged coupling portion 27, which is interiorly of greater diameter than the flange 19 and internally threaded at 28 to engage the threads 3 of the first sleeve 2. It has a planiform shoulder 22 normal to its longitudinal axis, extending from the end of the flared part 26, and opposed to the outer face of the flange 19.

A light metallic ferrule sleeve 29 lies between insulation 13 and sleeve 25 to permit the latter to turn freely as the coupling is assembled.

A rubber or leather annular gasket 30 is disposed within the coupling portion 27 and is compressed against the planiform end of sleeve 2 and flange 19 when the sleeves 2 and 25 are screwed together firmly.

This clamping action causes a partial extrusion of the insulation 13 toward the gasket 30 and so effects a hermetical seal there at the same time that the gasket becomes sealed against the planiform end seal face of the sleeve 2. The gasket serves as an extension from the sleeve 2 and has seal faces on both sides, the inner of which coacts with material 13 extruded or flowing as will be described. Should the gasket be too thin the material 13 will compensate in the action mentioned.

When the coupling 25 is engaged on sleeve 2, the forward tapered portion 17 of the sleeve 15 and its associated turned back conductor end 20 interfit with and against the tapered seat surface 4 of the first sleeve. Before the last-named engagement is effected, and as the sleeve 25 is drawn onto the first sleeve 2, the ferrule 29 is carried therewith and the portion 21 of the insulation 13, lying between the inner flared end of ferrule 29 and tapered surface 18, is compressed and flows into the annular space 35 between the three sleeves against the rubber gasket and against flange 19. The flange cooperates with sleeve 25 to force insulation 30 against the end face of sleeve 2 and press the sleeve 15 with its associated turned back conductor against the seat 4 in sleeve 2 of the abutting cable end. This last function insures good metallic contact of the two outer conductors of the connected cables. The cables are coupled in a pressure-proof manner when the displaced insulation and the gasket 30 together completely fill the said annular space 35.

The inner conductors 5 and 11 may be joined at 31 in any suitable manner such as cooperating pin and socket. A plastic material 32 may be forced into the cables at the joint, if desired. Or spaced beads may be relied upon if desired.

It should be noted that the internal tapered part 26 of the sleeve 25 is of sufficiently greater diameter than the long tapered end 18 of the sleeve 16, that if the sleeve 25 were screwed home on the sleeve 2, with the shoulder 22 against the flange 19 and the gasket 30 compressed, there would still be a space between the tapered parts 18 and 26 though measuring much less radially than the initial thickness of the insulation 13. Normally, however, the space between the shoulder 22 and flanges 19 is not closed when the coupling is completed although the material at 21 is considerably compressed and displaced.

It will be understood that initially the gasket 30 is thicker than when compressed, and it tends to be extruded slightly toward the left when the sleeve 25 is screwed home on the sleeve until the conductor 12 is tightly clamped against the seat 4.

In the preparation of the cable end 10, the sleeve 25 and then the ferrule 29 having been slipped on to the cable, a portion of the insulation 13 may be removed so as to leave the end of the external conductor 12 exposed for a distance sufficient to permit the part 18 of the floating sleeve 15 to be inserted around the conductor 12 and forced into the end of the cable wedging insulation 13 outwardly until the flange 19 is at or partly under the insulation 13 and the conductor 12 projects from under the sleeve 15. The end of the conductor 12 is trimmed so that it may be bent outward and back upon the short end 17 of sleeve 15, short of the flange 19, which is done, and the gasket 30 next set against the flange. The coupling is then ready for connection. First a plastic insulating material 32 is pressed into the spaces around the axial conductors 5 and 11 in conductor sleeve 2 and conductor 12, button or other spacer supports inserted.

The plastic 32 is applied so that when the sleeve 15 and conductor 12 are drawn up to the conductor 2, the applied plastic in the cable ends will meet and join as an integral body without an apparent joint at the junction thus formed. The plastic 32 may extend a short distance into the conductors 2 and 12 sufficient to assure its stability, and other supports used in the remainder of the conductors 2 and 12 in accordance with common practices. The conductors 5 and 11 being then conventionally connected, the sleeve 25 may be drawn over the junction and screwed home on the conductor 2.

When, in the preparation of the cable end 10 and application of the sleeve 15, the latter has been positioned with its flange slightly under the insulation 13, the subsequent coupling movements and function of the coupling parts when sleeve 25 is screwed home continue until the end portion 17 of the sleeve 15 presses the overlaid returned extremity of the conductor 12 tightly against the seat 4. An excess of the material 13 may by that time have been compressed and displaced from between the sleeves 15 and 25, and having become compacted to a maximum in the space 35, any continuing displacement of material 13 thereafter will be backward toward the outer end of the ferrule. The joint between the sleeves 2 and 25 and the intervening seal by gasket 30 and insulation 13 attained as described and shown within the space 35 will be an equivalent of a hermetic seal and therefore may be termed hermetical. It is moisture-proof as well as water-proof and gas tight and will insure the preservation of a stable pressure in the gas standing between the coaxial conductors when spaced supports are used with intervening clearances as commonly practiced. Lowering of dielectric value and liability of disturbance of transmission characteristics at high altitudes are thus guarded against, the first of which is essential in all installations, and the latter essential in many.

In the closing movement of the sleeve 25 on the sleeve 2, the flared portion 28 of the ferrule is pressed against the outwardly wedged portion 21 of the insulation, so that the latter is compressed and tends to be drawn along with the ferrule and sleeve 25. This results in a displacement of a portion of the insulation 13 as the flange 19 encounters and compresses the gasket 30, with the result that some of the insulation is extruded into the space 35 before the shoulder 22 and around the flange 19, against the gasket 30. The opposing tendency of the gasket 30 at the same time results in a very tight joint between the gasket and insulation, and between the gasket and the planiform end face of the sleeve 2 outwardly of the seat 4.

In case it becomes necessary to disconnect the coupling, the sleeve 25 is unscrewed from sleeve 2, and drawn back, after which the two cable elements are pulled apart, breaking the material 32, which may be reconnected by heating, if a thermoplastic, or by application of fresh material and/or solvent in the case of rubber or rubber cements. A seal within the conductors 2 and 12 at the joint is not essential in most cases, and bead or other inserted spacers may be preferred.

From the above description, it will be seen that the present invention provides a readily attachable and detachable cable which seals the cables in a pressure-proof manner at the joint. Also the current carrying metal surface, i. e. the outer surface of the central conductor and inner surface of outer conductor, maintain their geometrical configuration. This tends to maintain the characteristic impedance of the cable at a uniform value throughout the coupling.

Having thus described the invention, what I claim as new and desire to secure by Letters Patent is:

1. A coupling for coaxial first and second cable ends and the like, at least the second one having a plastically deformable hermetic sheath surrounding the outer conductor of the cable, a first sleeve constituting part of a sealed first cable end, a second sleeve disposed slidably on the second cable and around the outer conductor thereof, said second sleeve having an annular first wedge end inserted longitudinally under the said hermetic sheath and having an opposite second annular wedge end tapered inwardly to a sharp draw edge, the end edge portion of the underlying outer conductor of the second cable end being recurved over said second annular wedge end, the first sleeve having an annular conductor seat on its extremity to oppose the draw edge of the second sleeve and bindingly engage said recurved end edge portion of the outer conductor of the second cable end, a third sleeve around and slidable on the sheath of the second cable end interiorly taper-shaped around the first wedge end of the second sleeve to compress the interposed part of the sheath lying over the first wedge end, a part extended longitudinally from the first sleeve toward the third sleeve having an annular seal surface spaced from and around the second sleeve extending radially outward from near said recurved part of the outer conductor and positioned to receive in sealing engagement thereagainst annular insulating material compressed by material of said hermetic sheath extruded from between the second and third sleeves, and means to draw the first and third sleeves toward each other longitudinally and to couple the same.

2. A detachable coupling for flexible coaxial cable having an external plastically deformable insulation sheath, an outer flexible conductor thereunder and an inner conductor, said coupling comprising an outer coaxial conductor first sleeve and a first inner conductor end together constituting a first cable end, said coupling also comprising a second cable end of flexible coaxial cable and having a second sleeve slidably engaged around the outer conductor thereof, said second sleeve having an external flange therearound and a longitudinally extended tapered end for insertion between the said outer conductor and sheath of the second cable end and having also an oppositely projecting externally tapered conductor-clamping end, the end of the last named outer conductor being turned back on the said conductor-clamping end of said second sleeve, a third sleeve over said second cable end and overlying said second sleeve, a hermetic gasket disposed about the said conductor clamping end of the said second sleeve between the first sleeve and said flange, means on said first and third sleeves for coupling and drawing said sleeve telescopically together including a part on the third sleeve concentrically encircling said gasket and in concentric spaced relation to the periphery of said flange to form an annular space around said flange and containing the gasket, and adjacent said conductor clamping end part of said second sleeve, said second and third sleeves constructed to coengage the sheath therebetween and compress the material of the sheath so that it will flow into and fill the said annular space between the first and third sleeves around and past said flange until compressed as a hermetic gasket part in said annular space when the first and third sleeves are drawn together, whereby the cable ends are joined in a pressure proof manner hermetically sealed across the joint by the external insulation of the second cable end, and means for connecting the said inner conductors together.

3. In a coaxial cable coupling for first and second cable ends having respective axial conductors and respectively first and second coaxial conductors, means to couple the axial conductors, means to couple the coaxial conductors including an inner coaxial-conductor-gripping sleeve slidable to a gripping position on the second coaxial conductor, the first coaxial conductor constituting a sealed part of the first cable end for confining gas under pressure therein and having a coaxial annular conductor end seat opposed to said coaxial-conductor-gripping sleeve to coengage an interposed end part of the second coaxial conductor and having also an annular concentric end seal face radially outward of the said seat, the second cable end having a plastically deformable hermetic sheath over the coaxial conductor therein next to said coaxial-conductor-gripping sleeve, the extremity of said sheath annularly and concentrically enlarged in diameter, the said coaxial-conductor-gripping sleeve being enlarged toward the first named coaxial conductor adjacent the enlargement of the sheath, an external coupling sleeve surrounding and snugly fitting slidably on the hermetic sheath of the second cable end and interiorly taper-enlarged toward the first coaxial conductor around and beyond said enlargement of the hermetic sheath and around and in spaced relation to the enlargement of the coaxial-conductor-gripping sleeve at least to the said end seal face of the first coaxial conductor so as to form an annular seal-receiving space within said coupling sleeve extending to said end seal face, said coupling including means to draw said external sleeve toward the first coaxial conductor so as to compress and extrude material of said hermetic sheath against the enlargement of the said gripping sleeve and beyond in the seal receiving-space, and an hermetic seal in said space against said end seal face of the first conductor including at least in part material of said sheath extruded into said seal receiving space, whereby the pressure of said extruded material will operate the coaxial-conductor-gripping sleeve and press said hermetic seal against said end seal face to form a hermetic seal across the joint between the cable ends.

4. In a coupling for insulated flexible coaxial cables, a conductor sleeve of a size to align with an opposed end of an outer conductor of a flexible coaxial cable to form an interiorly flush continuation thereof and formed with a seat to coengage with an outturned end of such outer conductor, a second sleeve having separable connection with the conductor sleeve and having an extremity restricted to engage slidingly around a plastic insulation sheath of an insulated flexible coaxial cable and having an enlarged concentric annular chamber therein toward the conductor sleeve, and a clamping sleeve separate from both the conductor sleeve and said second sleeve and relatively and freely movable within at least the second sleeve, the clamping sleeve having a cylindrical interior of the same diameter as the exterior of the said outer conductor, one end of said clamping sleeve being thinned for insertion under the insulation of the flexible coaxial cable and over the outer conductor thereof and having an annular intermediate enlarged portion of less diameter than said chamber but arranged to project radially thereinto a distance, whereby a portion of said insulation sheath overlying the clamping sleeve may be compressed between the second named sleeve and the said enlarged portion of the clamping sleeve, so as to move the latter toward the first named sleeve and into clamping engagement with an outturned end portion of a coaxial conductor against said seat on the first named sleeve.

5. In a coupling for a flexible transmission line coaxial cable having an inner axial conductor and an outer coaxial conductor spaced from the inner conductor and having an outer plastically deformable hermetic insulation sheath: sleeve means comprising longitudinally separable and relatively slidable parts, one of said separable parts at least constructed and adapted to telescopically receive at least a portion of said transmission line cable and having spaced therewithin a relatively movable externally tapered clamp sleeve of an inner diameter closely approximating the external diameter of said transmission line outer conductor and insertable between said insulation sheath and said outer conductor, said first named sleeve means having an annular enlarged chamber with clearance around the larger diameter portion of said clamp sleeve, said one at least part of said separable and relatively slidable parts shaped with said tapered clamp sleeve for clamping the end portion of the said insulation sheath therebetween, holding means included in said first named sleeve means, the other of said separable and relatively slidable parts of said first named sleeve means and said clamp sleeve having opposed cooperative clamping portions to receive and clamp therebetween an end edge portion of said transmission line outer conductor, means to draw the said separable parts of the first named sleeve means together and axial conductor coupling means spaced within said coupling for coupling with said transmission line inner conductor.

6. In a coupling for flexible coaxial cables having plastically deformable external sheath insulation, a cable end having a sealed-on terminal concentric conductor sleeve formed with a seat for coengaging an opposed coaxial outer conductor end of a flexible coaxial cable, a nut sleeve having threaded engagement with the said terminal conductor sleeve, and having a longitudinally and taperingly restricted distal portion adapted at its smaller part to engage slidingly on the plastically deformable insulation sheath of an insulated flexible coaxial cable, and an intermediate rigid sleeve spaced movably within one at least of the first two sleeves, having an interior diameter the same as that of the outer diameter of the said outer conductor of the flexible coaxial cable to be connected, and having a tapered end insertable between the end portion of said sheath insulation and said outer conductor and having an intermediate external enlargement therearound the opposite end of the intermediate sleeve being shaped to receive end portions of said outer conductor of the flexible cable end, and to coact with said seat to clamp the interposed end portions of said outer conductor, said nut sleeve being formed with an annular chamber space concentrically therein extending from the larger part of said taperingly restricted portion thereof to slidingly receive the said intermediate sleeve, said restricted part of the nut sleeve and the tapered outer end of said intermediate sleeve being shaped and positioned to compress an interposed part of said insulation sheath when the first named sleeve and nut sleeve are drawn together, so as to extrude the sheath material longitudinally into said space and against the enlargement of the intermediate sleeve and to thereby move the latter into clamping relation to said terminal conductor sleeve upon an interposed extremity of said outer conductor of flexible coaxial cable, and means to form a coupling with the inner conductor of such flexible coaxial cable.

7. An automatic hermetic seal and separable coupling for flexible coaxial cable in which the cable comprises an axial conductor, an outer coaxial braid conductor spaced therearound and an external plastically deformable hermetic sheath insulation; said coupling comprising an inner axial conductor connector, an outer concentric conductor body having a bore closely approximating the inner diameter of said outer conductor of the cable and having an inner annular end seat extending from said bore, a circumferentially continuous cable - encircling sheath-compressing clamp sleeve opposed coaxially to said body and conically reduced at its extremity to the normal outside diameter of the cable, an interiorly cylindrical floating sleeve longitudinally slidable within said clamp sleeve at least and having an enlarged part toward the said body and of less diameter than the interior of said clamp sleeve to form an extrusion path therearound for sheath insulation compressed by said clamp sleeve, and in the path of relative longitudinal movement of the clamp sleeve and being also tapered toward the latter to a wedge shape for insertion between the end of said sheath and said outer conductor of a cable end and having an opposite braid-clamping end mated to said end seat, draw means to draw said clamp sleeve and said body together around the floating sleeve, said floating sleeve and sheath-compressing part of the clamp sleeve being variably spaced mutually and longitudinally in tandem relation and having initial effective sealing and clamping positions relative to an interposed part of said sheath, the said initial position of the floating sleeve being short of its full clamping position in relation to said end seat and an interposed braid end, said clamping sleeve having also a further inwardly spaced full clamping position in relation to said floating sleeve and interposed sheath material, and the floating sleeve having a further full clamping position in relation to the interposed braid end and said end seat, whereby when applied to a cable end and said draw means operated the sheath will be compressed against said floating sleeve by the clamp sleeve and the floating sleeve moved a distance thereby and finally hard pressed against the braid end by final movement of the clamp sleeve, said coupling including an elastic compressible hermetic sealing annulus outwardly of said end seat confined between the said body and extruded material around the floating sleeve at the last-named positions of the parts.

8. In a coupling for transmission line cable and the like having an outer tubular flexible conductor and a plastically deformable hermetic insulation covering; a hollow cylindrical conductive coupling body having on its end closely around the internal face of the body an annular clamp seat for an end portion of said outer conductor and having an annular seal face outwardly of said seat within the coupling to receive an annulus of insulation thereagainst, means for securing the outer conductor of said line to said body to form a smooth continuation of said outer conductor comprising a holding member shaped to receive the end portion of said line therethrough and adjustably connected to the body for longitudinal movement thereon, and means defining line insulation covering clamping means and an insulation receiving space extending to said seal face around an inserted end of said line within the coupling, the last named means comprising annular radially spaced opposed clamp surface parts at the outer end portion of the coupling within the holding member, the inner one at least tapered toward said end and having a sharp outer edge insertable in the line end between said insulation and said outer conductor, said holding member including the outer clamp surface part and being interiorly shaped and extended as a terminal continuation of the outer clamp surface part to slidingly fit around the insulation covering of the line beyond the clamp surface part to oppose outward movement of the insulation covering material on the line when said material is compressed by said insulation covering clamping means, said clamp surface parts being mutually arranged and proportioned so that a line insulation engaged therebetween will be compressed when the holding member is moved inward toward the body and the insulation material extrudingly displaced longitudinally inward into said space and reformed as a terminal gasket part integral with the line insulation in said space, said space being of greater diameter than the thickest part of said sleeve, so as to accommodate a part of said insulation material around and past said thickest part and having a radial extension to receive a portion of said insulation material extruded into said space from between said clamp surface parts so as to form a key element and seal to anchor the insulation of the line to the coupling until said holding member is withdrawn.

9. The structure of claim 8 wherein said inner clamp surface part within the holding member is a discrete sleeve-like member initially in a floating relation to said body and holding member, and having a conductor-clamping end face at its inner thicker end aligned with said seat and shaped to engage and clamp the extremity of the said outer conductor of an inserted line end against the said seat under pressure of said insulation against the floating annular part when said holding member is moved inward on the body into compressive engagement with the said insulation of the line overlying the inner clamp surface part.

10. The structure of claim 9 wherein said discrete member has a peripheral flange at its inner end to receive thereagainst material of said insulation extruded from between the opposed clamp surface parts, whereby the resultant of hydraulic forces effective through the insulation material is increased at the clamped part.

11. In a coupling of a coaxial type transmission line having an inner conductor, an outer concentric flexible conductor and an insulation covering of plastically deformable material as a sealing sheath around said outer conductor; a coupling body receiving an end of said line, a longitudinally movable holding sleeve adjustable longitudinally on the body and affording an annular space therewithin around the said end of the line to said body and receiving coaxially therein an end of the line, a concentric longitudinally movable floating annular member in said space surrounding the said end of the line and of the same internal diameter as the outer diameter of said outer conductor and having a tapered outer end portion with a sharpened end edge inserted coaxially in the end of the line between said outer conductor and said insulator covering, its said tapered end having an external conical sheath-clamping face, the major diameter of said floating annular member being less than the diameter of said space sufficiently to accommodate a part of said insulation covering around said floating annular member at its thickest part, said holding sleeve having an internal sheath-clamping face bounding a part of said space, opposed to and complementary to said tapered surface of said floating member and having a sheath-fitting outer terminal part extended from the end of said internal sheath-clamping face a distance for engagement around the insulation covering of the line beyond said complementary sheath-clamping face over a substantial distance, said coupling including means to secure the said holding sleeve in adjusted positions on said body in clamping engagement with sheath material of the inserted end of the line interposed between said clamping faces and extruded forwardly into the said space around and beyond said major diameter of said floating annular member, to be compressed against the latter and bear it against the extremity of the said outer conductor interposed between the floating member and said body, and whereby the extruded sheath material is compressed toward the said body and confined as a part at least of a hermetic seal between line insulation and coupling body.

WILLIAM D. HOPE.

References Cited in the file of this patent

UNITED STATES PATENTS

| Number | Name | Date |
|---|---|---|
| 1,060,600 | Jamieson et al. | May 6, 1913 |
| 1,223,444 | Tanner | Apr. 24, 1917 |
| 1,497,002 | Sanderson | June 10, 1924 |
| 1,718,817 | Greene | June 25, 1929 |
| 1,959,442 | Paulson | May 22, 1934 |
| 2,173,643 | Moser | Sept. 19, 1939 |
| 2,181,860 | Adkinson | Dec. 5, 1939 |
| 2,287,135 | Robertson | June 23, 1942 |
| 2,296,766 | Bruno | Sept. 22, 1942 |
| 2,425,834 | Salisbury | Aug. 19, 1947 |
| 2,449,983 | Devol | Sept. 28, 1948 |

FOREIGN PATENTS

| Number | Country | Date |
|---|---|---|
| 112,951 | Great Britain | Feb. 7, 1918 |
| 489,510 | Great Britain | July 28, 1938 |